Nov. 26, 1957
J. E. CONNOLLY
2,814,538
COMBINATION RADIAL AND END-THRUST BEARING
Filed March 5, 1953
2 Sheets-Sheet 1
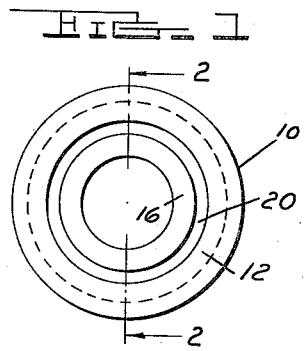
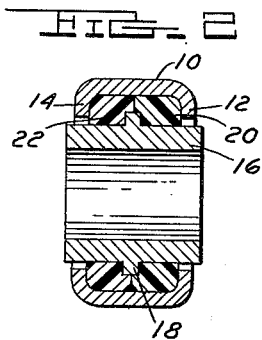
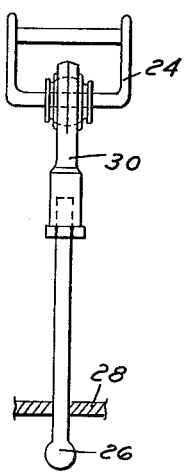
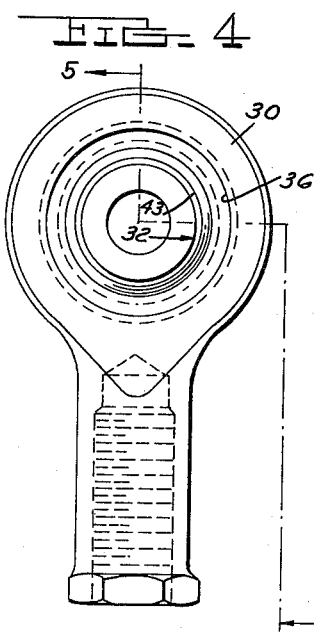
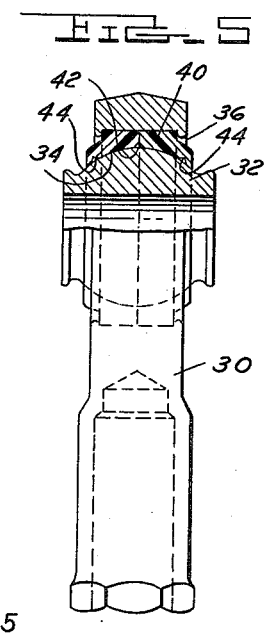
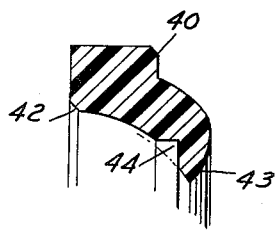
INVENTOR.
JOHN E. CONNOLLY
BY
Barnes, Kisselle, Laughlin & Raisch
ATTORNEYS Nov. 26, 1957   J. E. CONNOLLY   2,814,538
COMBINATION RADIAL AND END-THRUST BEARING
Filed March 5, 1953   2 Sheets-Sheet 2
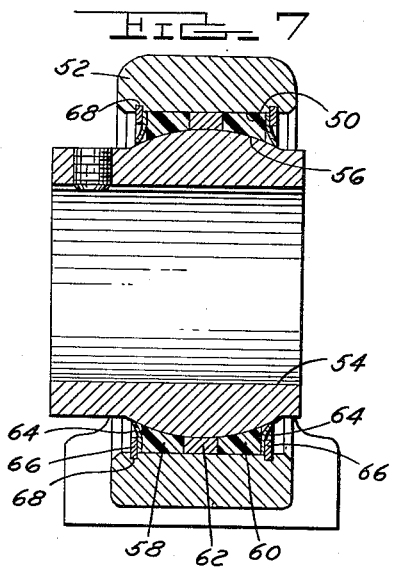
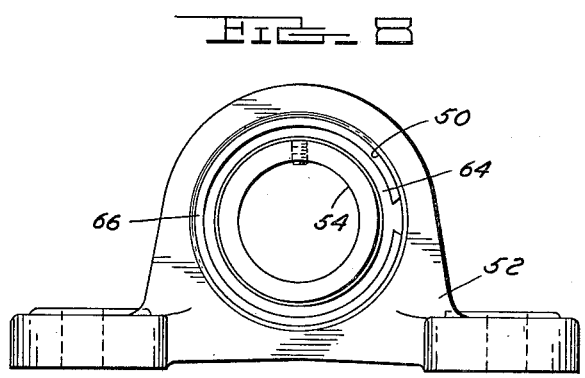
INVENTOR.
JOHN E. CONNOLLY
BY
*Barnes, Kisselle, Laughlin & Raisch*
ATTORNEYS

United States Patent Office 2,814,538
Patented Nov. 26, 1957

2,814,538

COMBINATION RADIAL AND END-THRUST BEARING

John E. Connolly, Detroit, Mich., assignor to O. and S. Bearing and Mfg. Co., Detroit, Mich., a corporation of Michigan Application March 5, 1953, Serial No. 340,616

3 Claims. (Cl. 308—72)

This invention relates to an improved bearing and has particularly to do with a composite type of bearing which is formed of an outer shell, an inner bearing member and an interposed bearing material.

It is an object of the invention to provide a bearing which has a construction capable of receiving radial and axial loads and which is extremely simple in design.

Another object of the invention is the provision of a bearing which is relatively simple to manufacture, thus cutting down the manufacturing costs so that the device may be acceptable for production parts in automotive vehicles and other machines where cost is of vital importance.

Briefly, the invention consists of a bearing having an outer shell with inwardly extending spaced walls, an inner shell having a longitudinally varying contour and a pair of members confined in said shell complementally matching the inner bearing members to provide a snug construction which permits rotation without endwise motion.

Other objects and features of the invention relating to details of construction as, for example, the provision of lubricant pockets and various means for forming the retaining walls, will be evident in the following description and claims.

Another specific object of the invention is the use of a portion of the bearing material for sealing the bearing against dirt and dust. This can either be accomplished with an integral portion of the bearing, as in one modification, or with a supplemental unit of bearing material.

Drawings accompany the disclosure, and the various views thereof may be briefly described as:

Figure 1, a side elevation of an assembled bearing constructed according to the present invention.

Figure 2, a sectional view of the bearing on line 2—2 of Figure 1.

Figure 3, an assembly view of a control rod part showing the use of a bearing constructed according to the present invention.

Figure 4, a side elevation of the bearing of Figure 3.

Figure 5, a sectional view on line 5—5 of Figure 4.

Figure 6, a sectional view of one of the bearing inserts of Figure 5 prior to assembly.

Figure 7, a sectional view of a pillow-block type of bearing utilizing the invention.

Figure 8, a side view of the bearing shown in Figure 7.

Referring to the drawings, in Figures 1 and 2 a bearing is shown with an outer shell member 10 formed of sheet metal and having inwardly extending spaced walls 12 and 14. An inner bearing 16 is disposed concentric with the shell 10 and has an annular ridge 18 spaced between walls 12 and 14.

Confined within the shell 10 and complemental to the bearing member 16 are bearing rings 20 and 22 formed of a plastic material, such as nylon. These rings 20 and 22 are recessed at their abutting surface to receive the ridge 18. When this assembly of parts is put together under a slight pressure from shell 10, the device is ready for operation.

In Figure 3 a yoke 24, which may be used for controlling a throttle or heater or any other accessory, is to be controlled by a rod 26 extending through a dash panel 28, for example. The control rod 26 extends into a knuckle bearing 30 which provides the outer housing of the bearing assembly to be described.

The inner bearing 32 has a spherical surface 34 concentric with the recess in the housing 30. This inner bearing is preferably chromium plated to resist wear and oxidation. Bushings 40 are provided to slip within the housing 30 and to abut around the member 32. The edges of the housing 30 around the bearing recess may then be swedged or spun to form spaced inwardly extending retaining walls 36 confining the bushings 40. The inner corners of the bushings 40 are chamfered so that in abutment the chamfered portions form an annular groove 42 which may serve as a lubricant-retaining chamber.

As shown in Figure 6, the bushings 40 prior to assembly have an inwardly extending annular rim portion 43 which has a radius of about .001 inch less than the normal radius of the bearing. An annular groove 44 is provided adjacent this rim 43 to serve as a lubricant receiving chamber.

When the bearing is assembled, the rim 43 is forced outwardly to the diameter of the inner member so that it has the same effective diameter as the remainder of the inner surface of the bearing member 40. The bushing 40 is preferably made of a plastic material having good bearing characteristics such as nylon, and the character of this material is such that a pressure will be exerted along the rim 43 around the inner bearing member to serve as a seal for the assembly. The groove 44 while not necessary for the purpose will facilitate the deflection required for the rim portion 43 in assembly.

The grooves 42 and 44 have been referred to as lubricant-retaining chambers. The lubricant which is retained in these grooves is known as the "O. and S. 252 Compound," particularly as disclosed specifically in Delp Patent No. 2,379,478, issued July 3, 1945. This material is relatively solid, that is, non-flowable, at room temperature, and it would be worked by the motion of the bearing between the surfaces of the bearing members to provide what is commonly referred to as a "self-lubricating" bearing.

In Figure 7 a slightly modified construction is shown embodying the principles of the invention. In this arrangement the bearing recess 50 is formed in a pillow block 52. The inner bearing member 54 has a spherical surface 56 concentric with the bearing opening of the pillow block. Surrounding and complemental to the outer surface of the bearing member 54 and the inner surface of the bearing member 52 are bushing members 58 and 60 disposed on either side of a lubricant-impregnated ring 62.

Bearing members 58 and 60 are preferably formed of a plastic material, such as nylon, having good bearing characteristics. The ring 62 is preferably formed of a fibrous material such as a fabric and impregnated with a suitable lubricant which can be distributed to all of the bearing surfaces by the action of the bearing.

Sealing rings 64 are clamped against the outer surfaces of bushings 58 and 60 by snap rings 66 which form the inwardly extending retaining walls for the outer member 52. These rings 66 are seated in annular grooves 68 at the edges of the bearing recess 50. The sealing rings are preferably formed of nylon plastic and are flat before assembly. The shape assumed in assembly, Figure 7, insures positive sealing pressure, and the nylon has a bearing contact with the inner member which would be impossible with a metal ring.

I claim:
1. In a bearing assembly of the type comprising an outer shell, an inner shell and one or more bearing members confined radially and axially between said shells by radially extending walls on one of said shells, a seal for said bearing members comprising a thin ring of nylon disposed with one radial portion against said bearing members confined axially by said walls and one radial portion bearing annularly in deflection against one of said shells to seal the surface between said bearing members and said one shell.

2. A bearing assembly to bear radial and axial loads comprising an outer unit, an inner unit to be movable relative to the outer unit, bearing members confined radially and axially between said units comprising preformed, presized bearing members having a radial dimension progressively decreasing in inward axial direction and formed of a relatively hard plastic material, such as nylon, means on one of said units confining said bearing members between said units under axial compression, said units and members being shaped prior to assembly whereby contacting surfaces are complemental to each other, and sealing means on the outsides of said bearing members comprising relatively thin rings of nylon disposed with one radial portion against said bearing members and another radial portion bearing annularly in deflection in lineal contact against the surface of one of said units to seal said surface between said unit and said bearing members.

3. A combination as defined in claim 2 in which said bearing members and said sealing rings are confined into position by snap rings seated in one of said units.

References Cited in the file of this patent
UNITED STATES PATENTS

| | | |
|---|---|---|
| 2,047,885 | Riebe | July 14, 1936 |
| 2,189,117 | Prentiss | Feb. 6, 1940 |
| 2,198,376 | Cederberg | Apr. 23, 1940 |
| 2,307,874 | Bilde | Jan. 12, 1943 |
| 2,423,684 | Collito | July 8, 1947 |
| 2,459,598 | Stott | Jan. 18, 1949 |
| 2,488,775 | Heim | Nov. 22, 1949 |
| 2,607,084 | Cotchett et al. | Aug. 19, 1952 |

OTHER REFERENCES

Product Engineering, 1953 Annual Handbook, pages C30 to C33 (November 18, 1952).